H. Ames
Cannon & Gun Barrels
Nº 43825.  Patented Aug. 16. 1864
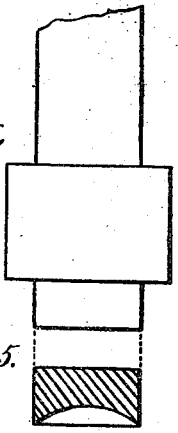
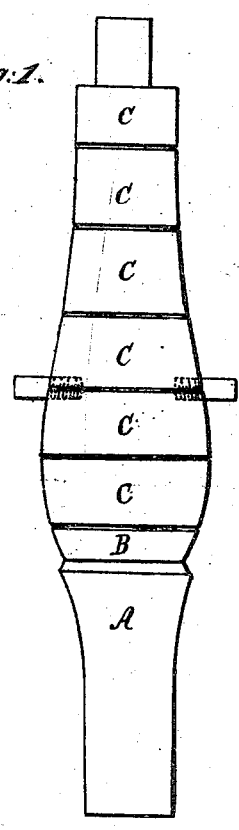
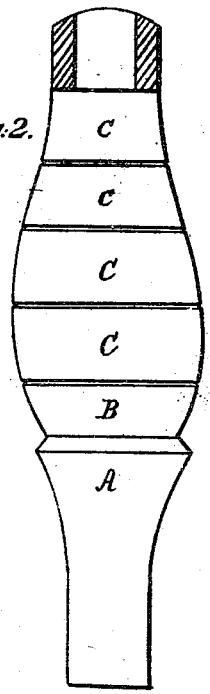
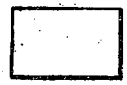
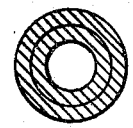
Witnesses  
H. J. Ramsdell  
Charles Herrin
Inventor  
Horatio Ames  
Pr D. E. Somes & Co  
Attys.

UNITED STATES PATENT OFFICE.

HORATIO AMES, OF FALLS VILLAGE, CONNECTICUT.

IMPROVEMENT IN THE MANUFACTURE OF WROUGHT CANNON.

Specification forming part of Letters Patent No. 43,825, dated August 16, 1864.

*To all whom it may concern:*

Be it known that I, HORATIO AMES, of Falls Village, county of Litchfield and State of Connecticut, have invented a new and useful Improvement in the Method of Constructing Wrought-Iron Cannons; and I do hereby declare that the following is a full and exact deception thereof, reference being had to the accompanying drawings, and to the letters of reference marked thereon.

The manner of making my wrought-iron gun is as follows: A handle or porter-bar of sufficient length and size is made to handle the gun while in process of manufacture. The porter-bar is worked up to the proper size for the diameter of the gun, and one or more circular pieces of iron is welded to the end of it, to form the breech of the gun, which will thus be made solid. Cross-sections of the gun are made by bands or rings of different sizes, which are made to fit one within the other, forming a compound ring before being welded, the rings being turned and planed on all sides and in the bore before being welded. As the rings fit perfectly together, they weld much better on account of the clean even surface presented, and all defects in the iron may be detected in the turning and planing of the rings on all sides and in the bore. The concentric rings are heated upright in a furnace, and that portion of the gun which has been already made on the porter-bar is heated in another furnace, and when both are welding hot, they are brought together by cranes and tongs. When within an inch or two, more or less, of each other, after the first ring is welded on, a pin is run through the ring which is to succeed it, and into the ring welded to the porter-bar. This operation is repeated in the welding of each succeeding ring, and thus a perfectly central hole or bore is made. By heating the rings upright, only the side to be welded is made welding hot. The other side will not be injured by being brought to a welding-heat more than once. The front face of the piece forming the breech of the gun, and also of each ring, after being welded on is rounded by a concave former, turned so as to give a convex shape to the face of the plate or rings, and thus in welding, the rings will unite first at the center or next the bore, and uniformly out to their edges, so that any flaws that may be in the iron where it is welded will be forced out to the edge of the rings, so that there will be no defect in the welding. The number of rings of which the gun is composed depends upon the thickness of the rings and the length of the gun. After the rings are all welded on, the gun is cut from the porter-bar, which may be again used for the manufacture of another gun. In making my gun I carry out the full size of the breech to beyond the trunnions, so that the trunnions may be fastened to the gun by being screwed into it or by any other suitable means.

In the accompanying drawings, A, Figure 1, represents the porter-bar, with the plate forming the breech of the gun, and all the rings forming the barrel of the gun welded to it, B being the breech-plate, and C C C being the the rings. Fig. 2 represents the gun in the course of construction, showing a sectional view of a ring after being welded and the face thereof rounded by the convex former. Fig. 3 is a side view of a ring ready for the furnace. Fig. 4 is a cross-sectional view of a section of the gun, composed of rings, one within another. Fig. 5 is the concave former, for giving a convex form to the face of the ring after being welded. Fig. 6 is a bunter, driven by steam or other power, for welding the rings and for driving the concave former. Fig. 7 is the pin to run through the hole in the rings when being welded to make the bore of the gun perfectly central.

What I claim as new, and desire to secure by Letters of Patent, is—

1. Giving a convex form to the face of the plate and rings after being welded, for the purpose set forth.

2. The use of planed and turned rings, Figs. 3 and 4, and the heating of the same in an upright position, substantially as set forth, in combination with the pin, Fig. 7, and convex surface of the rings, as shown in Fig. 2.

HORATIO AMES.

Witnesses:
  H. J. RAMSDELL,
  CHARLES HERRON.